United States Patent [19]

Shoda

[11] Patent Number: 5,980,172

[45] Date of Patent: Nov. 9, 1999

[54] DOUBLE CUTTING SPINDLE UNIT FOR A CUTTING MACHINE

[75] Inventor: Hiroshi Shoda, Hamamatsu, Japan

[73] Assignee: Shoda Iron Works, Ltd., Japan

[21] Appl. No.: 09/063,143

[22] Filed: Apr. 20, 1998

[51] Int. Cl.[6] .................................................. B23C 1/12
[52] U.S. Cl. .............................. 409/203; 29/50; 144/1.1; 144/135.2; 408/36; 408/239 R; 409/136; 409/192; 409/213; 409/217; 409/232
[58] Field of Search .................................. 409/135, 136, 409/192, 203, 213, 217, 230, 231, 232, 233, 234; 408/26, 31, 36, 39, 42, 56, 238, 239 R, 239 A; 144/135.2, 1.1; 29/335, 39, 50, 53

[56] References Cited

U.S. PATENT DOCUMENTS

| | | | |
|---|---|---|---|
| 1,556,852 | 10/1925 | Ducer | 409/213 |
| 2,483,535 | 10/1949 | Gallimore | 409/203 |
| 2,887,016 | 5/1959 | Daugherty et al. | 409/213 |
| 3,559,530 | 2/1971 | Wagner et al. | 409/192 |
| 4,326,824 | 4/1982 | Lasermann et al. | 409/213 |
| 4,945,958 | 8/1990 | Shoda | 409/217 |
| 4,949,942 | 8/1990 | Shoda | 409/192 |
| 5,848,863 | 12/1998 | Liao | 409/203 |

OTHER PUBLICATIONS

"NC–Machines, NC•Router, NCW–516", Shoda Iron Works, Issued Oct. 1997.

*Primary Examiner*—Daniel W. Howell
*Assistant Examiner*—Christopher Kirkman
*Attorney, Agent, or Firm*—Harness, Dickey & Pierce, P.L.L.C.

[57] ABSTRACT

A double cutting spindle unit comprising a main spindle unit and a sub-spindle unit mounted on the main spindle unit and vertically slidable relative to the main spindle unit. The chucking member is normally biased toward its fastening direction by a fastening spring formed by a plurality of spiral belleville springs arranged around the chuck actuating shaft. A two-stage hydraulic cylinder comprising two coaxially arranged cylinders is mounted on a supporting frame arranged on the top cover, and the actuating rod of the hydraulic cylinder is arranged with its free end being opposite to the end of the chuck actuating shaft.

6 Claims, 6 Drawing Sheets

DOUBLE CUTTING SPINDLE UNIT FOR A CUTTING MACHINE

BACKGROUND OF THE INVENTION

1. Field of the Invention

The present invention relates to a cutting spindle unit for a cutting machine, especially a router for wood working and, in particular, to a double cutting spindle unit comprising a main spindle unit and a sub-spindle unit mounted on the main spindle unit and being vertically slidable relative to the main spindle unit.

2. Description of Background Art

In recent years, it has been proposed to provide a router for wood working having a double cutting spindle unit comprising several main spindle units each being mounted slidably vertically on a planer-type frame, and a sub-spindle unit also mounted slidably vertically on each main spindle unit, with the main and sub-spindle units being able to integrally move along the Y-axis direction as well as being able to separately move along their axial (i.e., Z-axis) directions in order to increase the number of places to be simultaneously cut by the router and also to reduce the frequency of tool exchange.

The mounting of tools to the spindle units are carried out by the collet chuck mechanisms both in the main and sub-spindle units. However, there is a difference between the sub-spindle unit and the main spindle unit in that the collet chuck of the sub-spindle unit is manually actuated, whereas the main spindle unit is remote-controlled by a powered actuator.

The powered actuation of the main spindle unit will be hereinafter described with reference to FIG. 4. An end of a spindle 22 of the main spindle unit 20 is formed with a tapered bore Aa, and a collet chuck Ab is positioned inwardly adjacent to the tapered bore Aa. After having inserted a tool attachment Ba into the tapered bore Aa, the collet chuck Ab is fastened by the force of belleville springs Ac and thus the tapered portion of the tool attachment Ba is pulled into the tapered bore Aa and frictionally engages the inner surface thereof. In order to remove the tool attachment Ba from the spindle 22, a piston rod Cb is projected by a pneumatic cylinder Ca having a large diameter. The power of the piston rod Cb is boosted by a lever Cc and pushes an actuating shaft 26 downward against the force of the belleville springs Ac to release the collet chuck Ab. Simultaneously, the front end 26a of the actuating shaft 26 abuts the rear end of the tool attachment Ba to release its frictional engagement with the tapered bore Aa. A reference character "Cd" denotes a stopper for the lever Cc. In general, wood working machines which generate sawdust or woodchips typically use pneumatic cylinders as hydraulic actuators, which can experience oil leakage problems.

Since the size of the sub-spindle unit is required to be small, the outer diameter of the collet chuck should be small and its detachable mechanism should be simplified. In addition, the opening and closing operations of the collet chuck and the pushing-out operation of the tool attachment are carried out by a manually operated screw shaft (not shown). Since such a manual operation requires substantial time and labor for mounting and demounting of the tool attachment, it is desired to develop a collet chuck which can be operated by power and also can fulfill the requirements of small size and light weight.

However, there are several problems which must be overcome before the successful development of such a collet chuck can be realized. Firstly, it is impossible to get a small and powerful power source used for mounting and demounting the tool attachment to and from the spindle. As previously mentioned, the mounting of the tool attachment Ba to the collet chuck Ab of the main spindle unit is carried out by the force of a plurality of strong belleville springs Ac and the demounting of the tool attachment Ba therefrom is carried out by the pneumatic cylinder Ca. However, such a mounting and demounting mechanism of the main spindle unit cannot be applied to that of the sub-spindle unit due to potential interference of the sub-spindle unit with the main spindle unit if the outer diameter of the sub-spindle unit is increased to accommodate a large diameter power cylinder or a boosting lever which can generate sufficient power to overcome the force of the belleville springs.

Secondly, there is practical difficulty due to instability of the spring constant of the belleville springs caused by the mutual friction between springs when using belleville springs of small diameter to be accommodated within the sub-spindle casing.

Thirdly, there is the problem of preventing the mutual interference between the main and sub-spindle units during tool exchange of these spindle units. That is, in the case of the sub-spindle unit of the prior art which is manually operated to mount or demount the tool attachment, the lower stroke limit of the sub-spindle unit is set at a position higher than that of the main spindle unit in order to prevent the interference of the sub-spindle unit with the main spindle unit since the tool of the manually operated spindle unit is not required to be lowered to the position of the automatic tool exchanger of the main spindle unit. Moreover, with a sub-spindle unit that is automatically operated to mount or demount the tool attachment, if the tool attachment is lowered to the position of the automatic tool exchanger, there would be caused an occasion in which the presence of the tool attachment of the sub-spindle unit will interfere with the tool exchange of the main spindle unit or an occasion in which the presence of the main spindle unit will interfere with the exchange of the tool exchange of the sub-spindle unit.

SUMMARY OF THE INVENTION

It is, therefore, an object of the present invention to provide a double cutting spindle unit for a cutting machine which can overcome the problems of the prior art.

This object is achieved by the double cutting spindle unit of the present invention in which a hydraulic cylinder is mounted on a supporting frame arranged on the top cover, and an actuating rod of the hydraulic cylinder is arranged with its free end being opposite to the end of the chuck actuating shaft. The vertically extending hydraulic cylinder and the supporting frame do not project significantly in the lateral directions and thus their presence does not interfere with the vertical movement of the sub-cylinder unit.

If the hydraulic cylinder is formed by a two-stage hydraulic cylinder comprising two cylinders coaxially arranged with each other, a strong force required to demount the tool attachment can be obtained without any boosting means such as the lever in the prior art. Although the axial, i.e., vertical dimension, is somewhat increased, the lateral dimension of the sub-spindle unit can be reduced and thus interference between the main and sub-spindle units during their vertical movements is prevented.

The supporting frame is formed as a cylindrical body having high rigidity. However, since the presence of the supporting frame reduces the area of the top cover in which a ball bearing is mounted that is in direct contact with ambient air, the side wall of the supporting frame is formed with a venting window for increasing the heat dissipation from the ball bearing in the top cover. The bearing and the cylinder unit can be forcibly air-cooled by providing a detachable shroud for surrounding the supporting frame and a venting means for circulating ambient air within the shroud.

In addition, the fastening spring is preferably formed by a plurality of spiral belleville springs which are stable in their spring constant despite having a small diameter. This enables the accommodation of the spiral belleville springs within a small diameter spring bore.

Furthermore, the lower stroke limit of the main spindle unit is set so that it substantially corresponds to that of the sub-spindle unit. This serves to prevent mutual interference between the main and sub-spindle units during their tool exchange.

BRIEF DESCRIPTION OF THE DRAWINGS

A preferred embodiment of the present invention will be described with reference to the accompanied drawings in which.

DESCRIPTION OF THE PREFERRED EMBODIMENT

Figure 1:
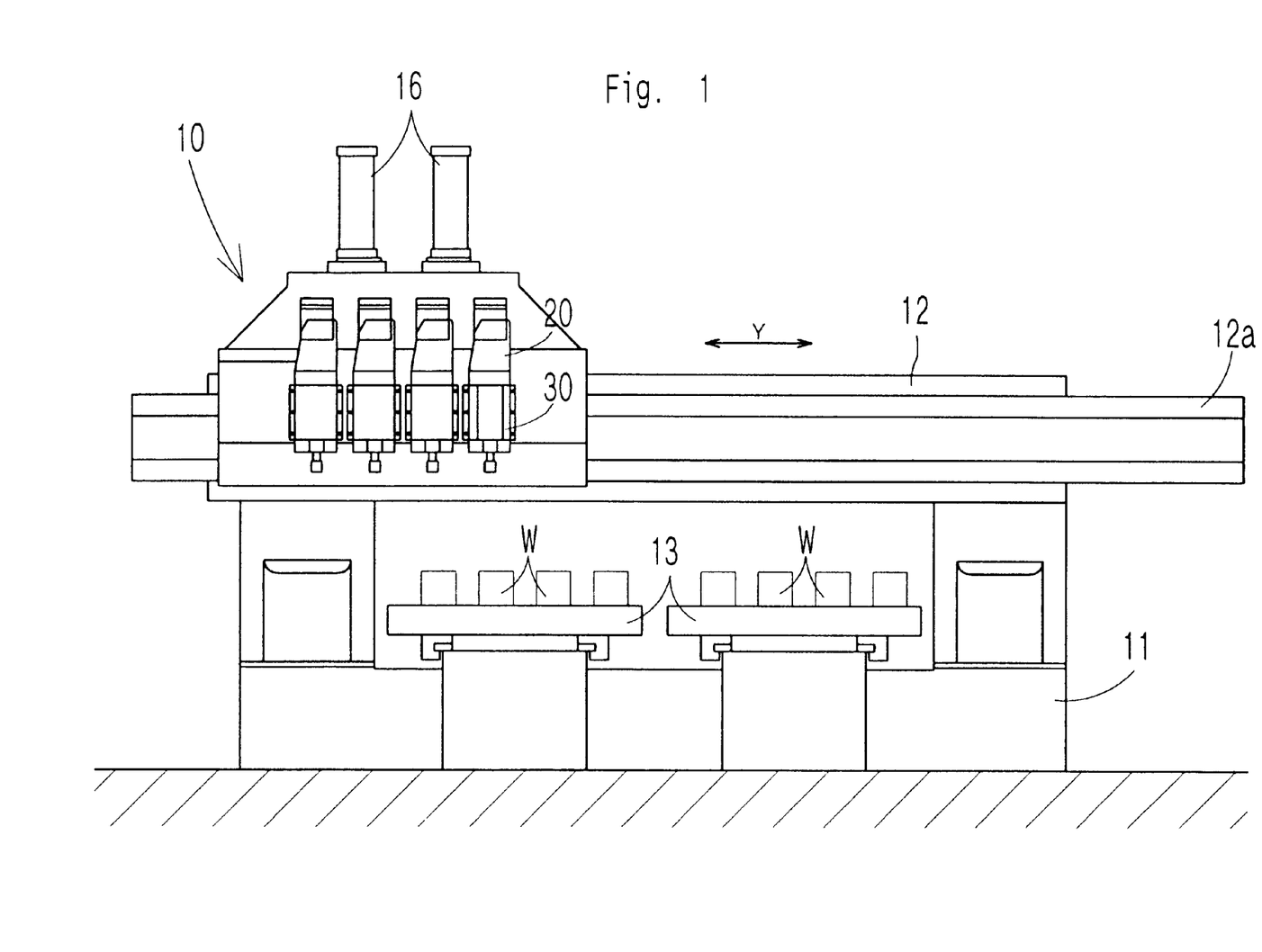
FIG. 1 is a front elevational view of one embodiment of a double cutting spindle unit of the present invention.
Figure 2:
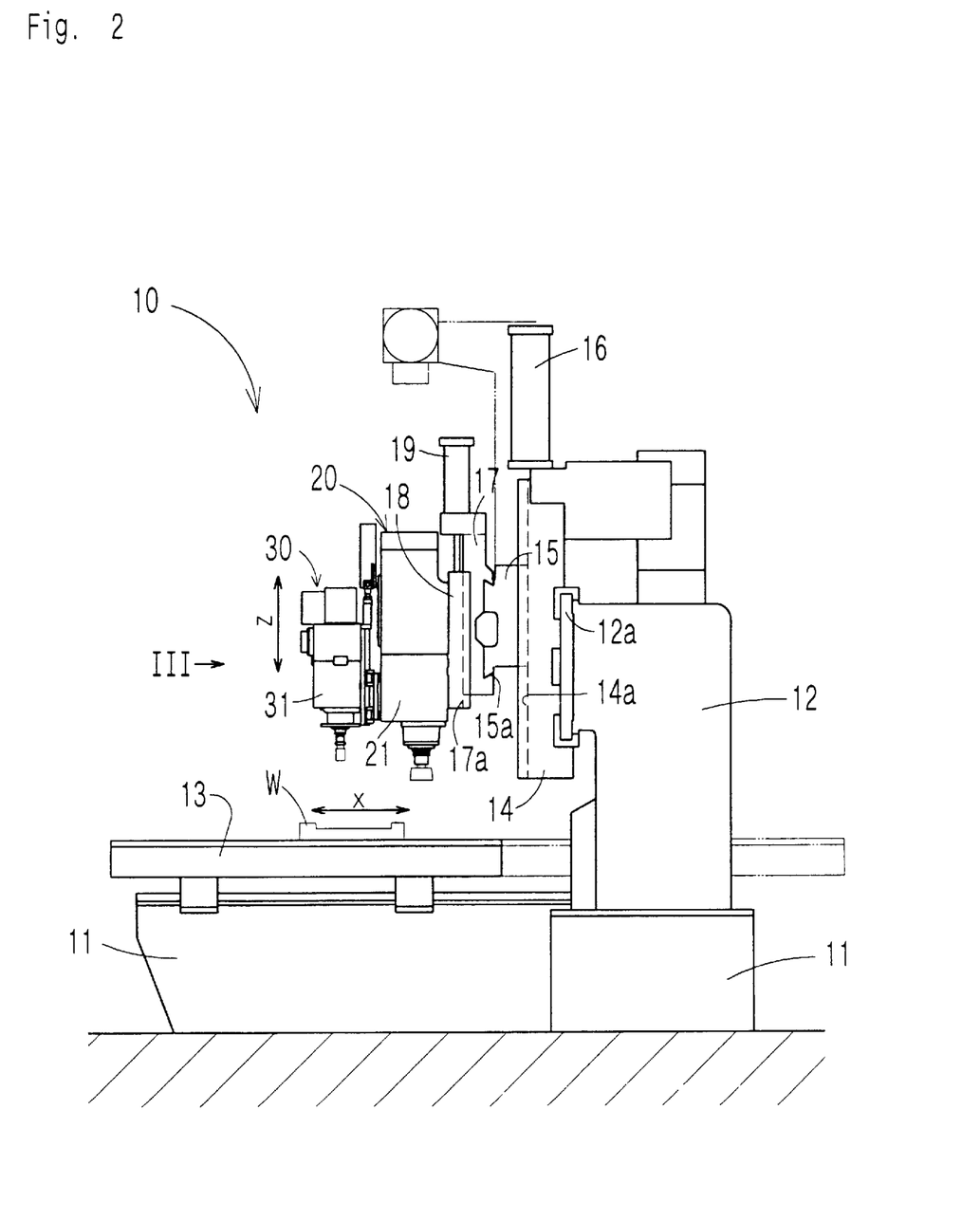
FIG. 2 is a side elevational view of FIG. 1.

FIG. 1 shows a numerical controlled router for wood working according to the present invention. The router 10 has a bed 11 on which a planer-type column 12 is rigidly secured and tables 13 are slidable in the X-axis direction (FIG. 2). A reference numeral "W" denotes a work laid on the table 13 and a reference numeral "T" (FIG. 4) denotes a cutting tool such as a drill or cutter.

The column 12 is formed with a first slide surface 12a on which a first slider 14 is supported slidably in the Y-axis direction (FIG. 1). The first slider 14 is formed with a first vertical slide surface 14a on which a first vertical slider 15 is slidably supported and driven by a servo motor (not shown). An air balancer 16 pulls the first vertical slider 15 upward to counteract the weight of the first vertical slider 15 loading on the servo motor used for elevating the slider 15 to enable the servo motor to rapidly accelerate the first vertical slider 15.

The first vertical slider 15 is formed with a second slide surface 15a of dovetail shape extending in parallel with the first slide surface 12a on which a second slider 17 is slidably supported. The second slider 17 is formed with a slide surface 17a for a tool exchanger on which a slider 18 for the tool exchanger is slidably supported. A reference numeral 19 denotes a pneumatic cylinder for driving the slider 18. From such a structure, the main spindle unit 20 can be moved in the Y-axis direction along the first slide surface 12a of the column 12 and a Z-axis direction (FIG. 2) along the first vertical slide surface 14a formed on the first slider 14. Thus, three-dimensional relative motion between the work W and the tool T can be achieved by these motions of the main spindle unit 20 in Y-axis and Z-axis directions as well as the motion of the table 13 in the X-axis direction.

Figure 4:
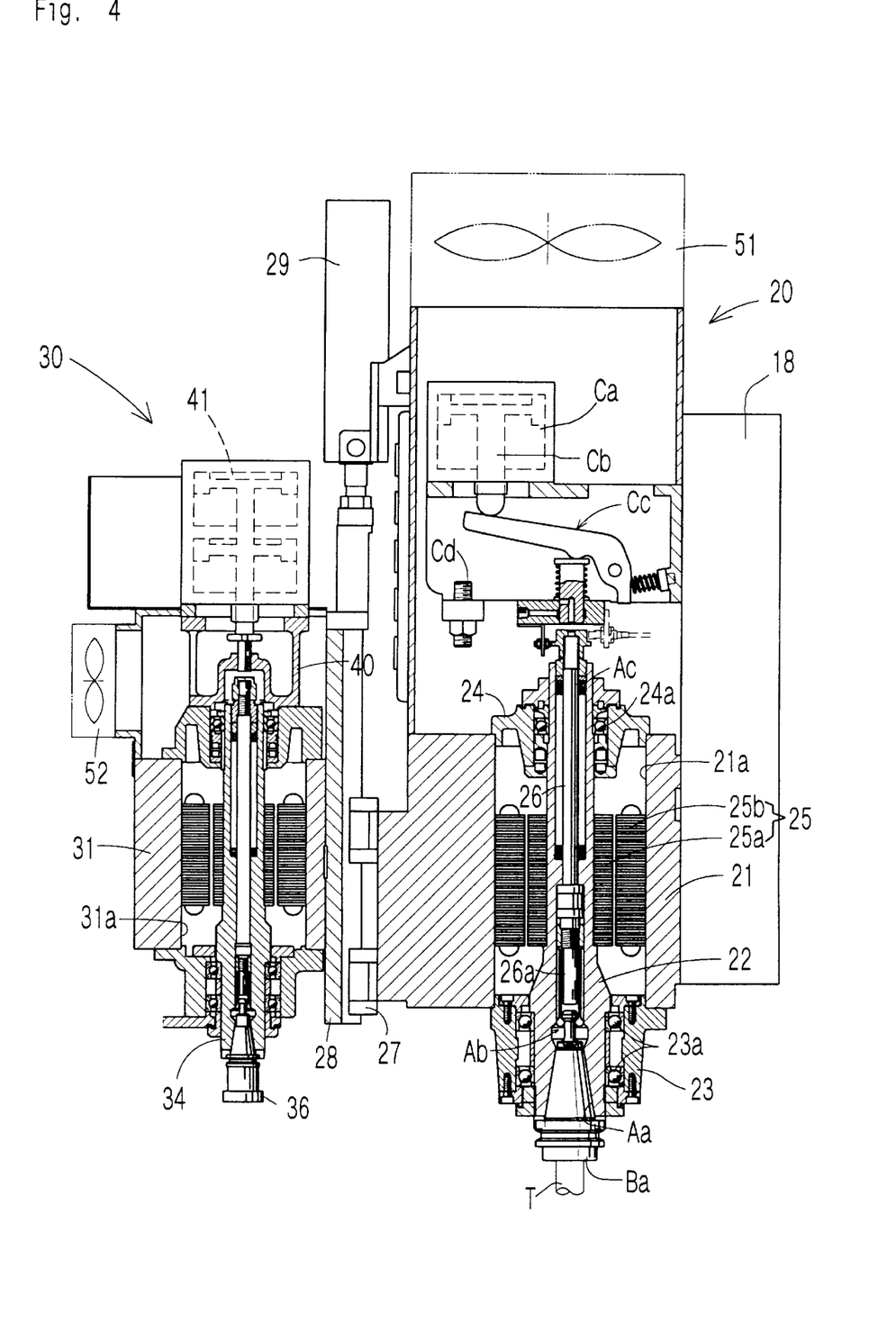
FIG. 4 is a cross-sectional view taken along a line IV—IV in FIG. 3.

As shown in FIG. 4, the main spindle unit 20 has a main spindle 22 rotatably supported on a main spindle casing 21. The main spindle casing 21 is formed with a cylindrical bore 21a the open ends of which are covered by a bottom cover 23 and a top cover 24. The main spindle 22 is rotatably supported by ball bearings 23a and 24a which are supported by the bottom and top covers 23 and 24, respectively. A reference numeral 25 denotes an electric motor, a rotor 25a of which is secured to the main spindle 22, and a stator 25b of which is secured to the inner surface of the bore 21a. Thus, the main spindle 22 is directly driven by the electric motor 25 and is able to rotate the tool attachment Ba at a high speed over 10,000 rpm.

A slider 28 secured on a sub-spindle casing 31 is slidably supported on a slide pad 27 mounted on the main spindle casing 21. The sub-spindle casing 31 is slidably driven in parallel with the axis of the main spindle 22 by a pneumatic cylinder 29 mounted on the upper portion of the main spindle casing 21. A reference numeral 51 denotes a cooling fan of the main spindle unit 20 for cooling the hydraulic cylinder Ca and a ball bearing 24a supported by the top cover 24.

Figure 5:
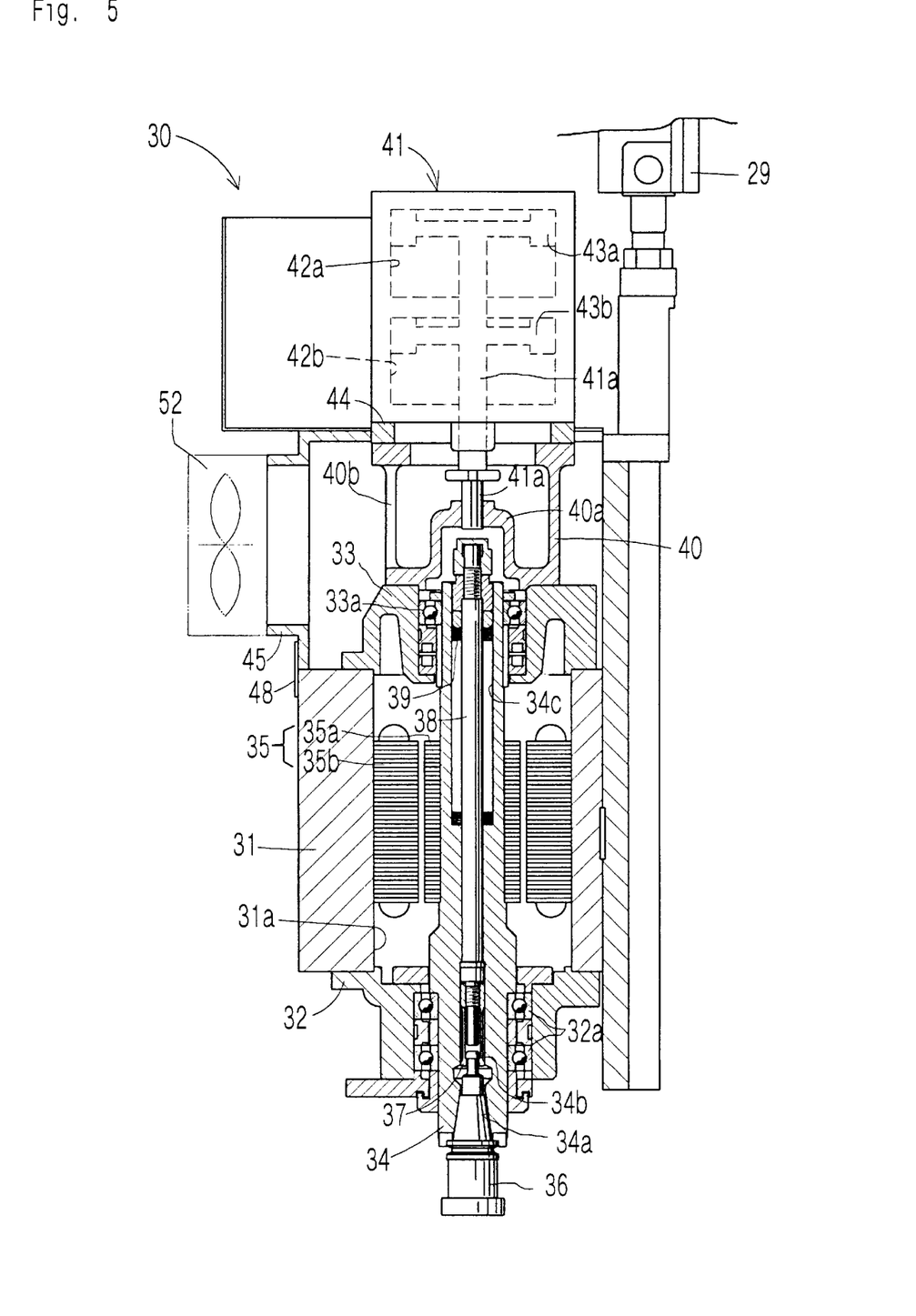
FIG. 5 is an enlarged cross-sectional view of a sub-spindle unit of the present invention.

As can be seen from FIG. 5, the sub-spindle unit 30 has a sub-spindle 34 supported by the sub-spindle casing 31. The sub-spindle casing is formed with a cylindrical bore 21a the open ends of which are covered by a bottom cover 32 and a top cover 33. The sub-spindle 34 is rotatably supported by ball bearings 32a and 33a which are supported by the bottom and top covers 32 and 33, respectively, and is directly driven by a sub-spindle motor 35 arranged within the cylindrical bore 31a. A reference numeral 35a denotes a rotor of the electric motor 35 directly secured to the sub-spindle 34 and a reference numeral 35b denotes a stator secured to the inner surface of the cylindrical bore 31a.

The sub-spindle 34 has a through bore and is formed with an outwardly diverging tapered bore 34a at the bottom of the sub-spindle. A chuck bore 34b and a spring bore 34c having different diameters are formed upwardly from the tapered chuck bore 34a. A reference numeral 37 denotes a chucking member coacting with the chuck bore 34b, the chucking member 37 and chuck bore 34b forming a well-known collet chuck. A reference numeral 38 denotes an actuating shaft of the collet chuck, the front end, i.e., distal end, of which is opposite to the rear end, i.e., proximal end, of the tool attachment 36 through the chucking member 37. The proximal end of the actuating shaft 38 extends to the top end of the sub-spindle 34 through the spring bore 34c. A reference numeral 39 denotes a fastening spring urging the actuating shaft 38 upwardly. In this embodiment, the fastening spring is formed by a plurality of spiral belleville springs which exhibit a stable spring constant despite having a small diameter. Thus, the tool attachment 36 can be mounted or demounted by moving the actuating shaft 38 rearward or forward similarly to the conventional collet chuck.

Figure 3:
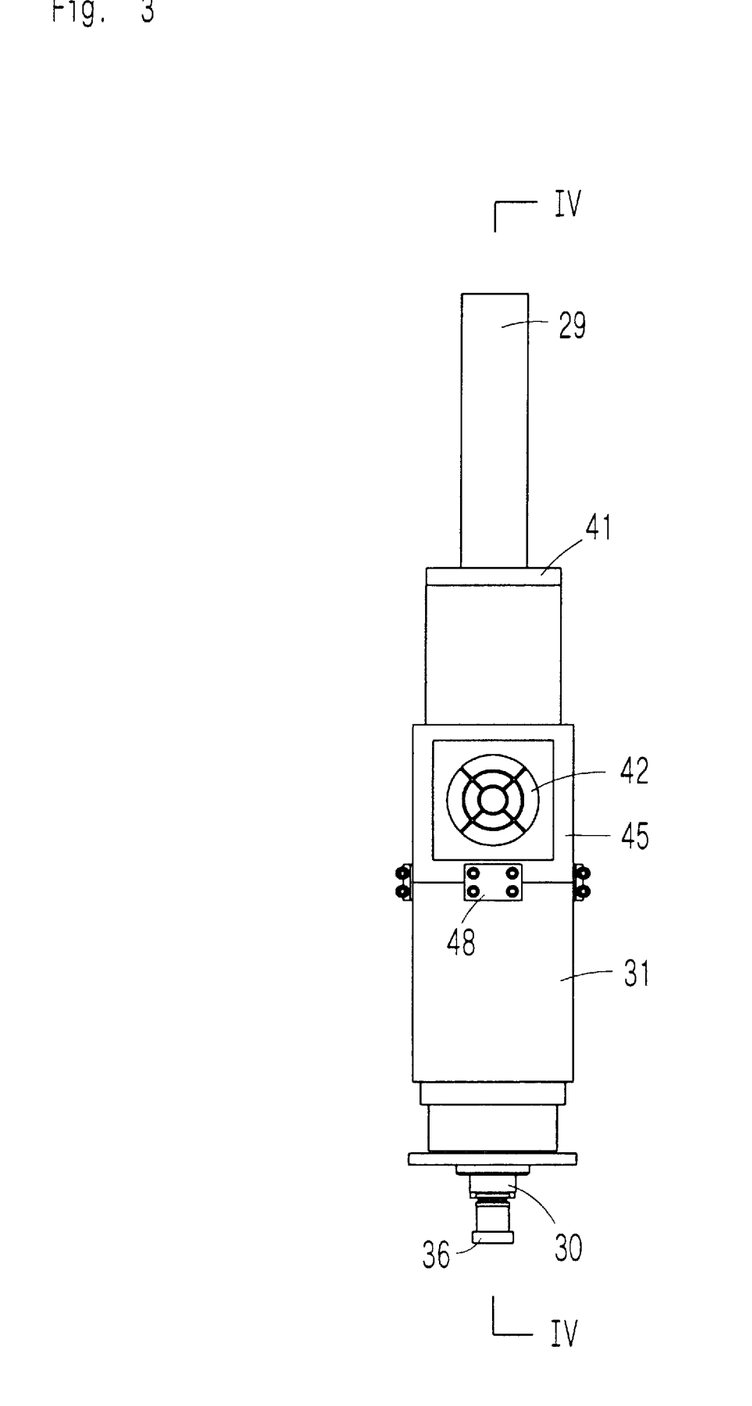
FIG. 3 is a front elevational view of a sub-spindle unit taken from an arrow III in FIG. 2.
Figure 6:
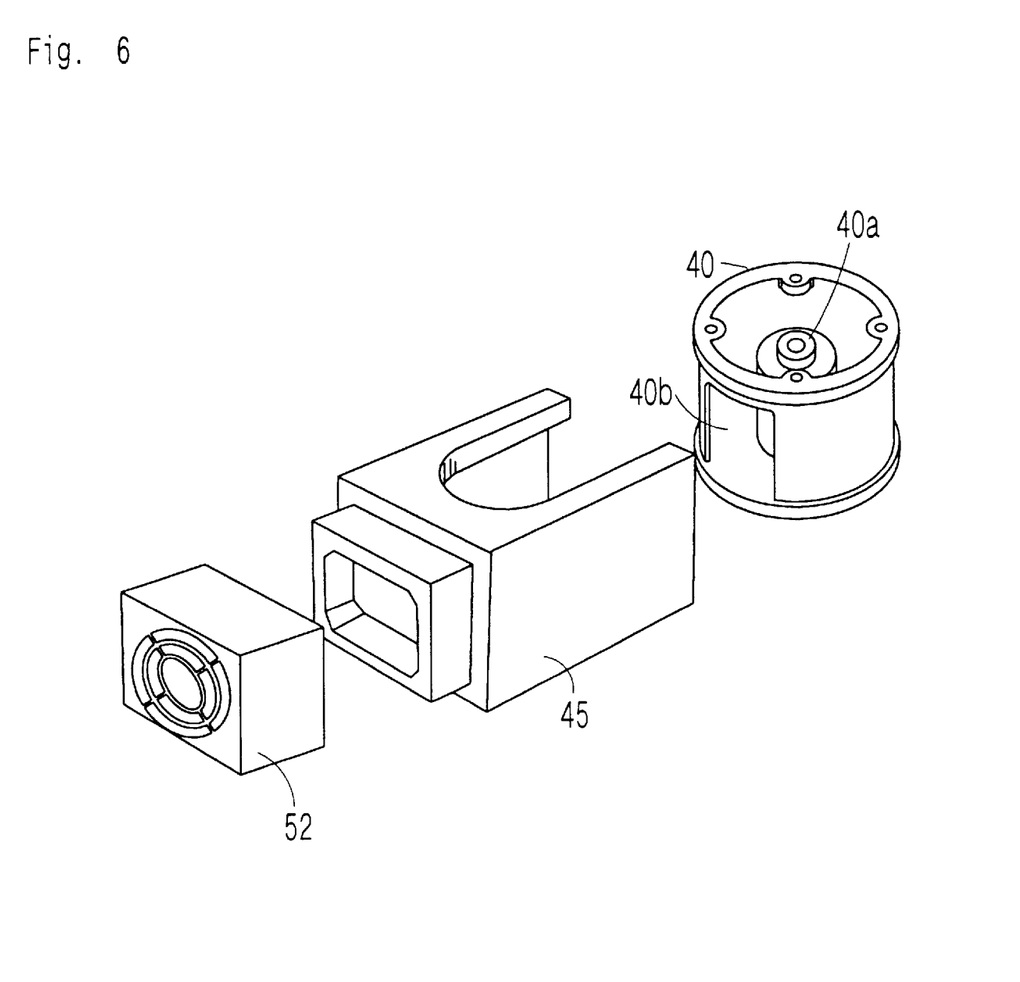
FIG. 6 is an enlarged perspective view of a detachable shroud and its relating parts.

The top cover 33 has a circular configuration in its plan view. A substantially cylindrical supporting frame 40 is bolted on the top cover 33 and a hydraulic cylinder 41 is also bolted on the upper surface of the supporting frame 40 via a spacer 44. A reference numeral 41a denotes a piston rod which is an output means of the hydraulic cylinder 41. Within the supporting frame 40, there is integrally formed a guide 40a for guiding the distal end of the piston rod 41a. A substantially rectangular venting window is formed in the side wall of the supporting frame 40. A detachable shroud 45 is attached to the outer surface of the supporting frame 40 and is bolted to a holding plate 48 (FIG. 3). A reference numeral 52 is a cooling fan attached to the detachable shroud 45 that is adapted to be continuously operated during the operation of the router 10. The cooling air fed by the fan 52 passes through a space within the supporting frame 40 or a space between the supporting frame 40 and the shroud 45 and directly cools the hydraulic cylinder 41, the guide 40a and the top cover 33 supporting a ball bearing 33a and indirectly cools these members via the cooled supporting frame 40.

The hydraulic cylinder 41 comprises two separate cylinders 42a and 42b within which pistons 43a and 43b are slidably arranged. The pistons 43a and 43b are mutually connected by the common piston rod 41a. Accordingly, the hydraulic cylinder 41 is formed as a two-stage hydraulic cylinder and thus pressurized fluid is supplied simultaneously to the upper or lower surfaces of the pistons 43a and 43b. The resultant force of the pistons 43a and 43b is outputted from the piston rod 41a as an output of the hydraulic cylinder 41.

The tool exchange can be carried out similarly to the conventional manner by moving the sub-spindle unit 30 together with the main spindle unit 20 to a predetermined position, moving the automatic tool exchanger to a position directly under the main spindle unit 20 or the sub-spindle unit 30, actuating the pneumatic cylinder 29 to lower only the sub-spindle unit 30, and then by remotely controlling the chucking member 37 and the hydraulic cylinder 41 connected to the actuating shaft 38 for actuating the chucking member 37.

Since the size of the sub-spindle unit is small due to the use of the hydraulic cylinder, it is possible to carry out the remote control mounting and demounting operation of the collet chuck.

In addition, it is possible to rapidly carry out the tool exchange and thus reduce the amount of labor and improve the rate of operation.

What is claimed is:

1. A double cutting spindle unit for a cutting machine comprising a main spindle unit having a vertical axis along which the main spindle unit can slide relative to a frame of the cutting machine; a sub-spindle unit mounted on the main spindle unit in parallel therewith and also vertically slidable relative to the main spindle unit; a sub-spindle casing having a passage extending therethrough; top and bottom covers for covering a top end of the through passage of the sub-spindle casing and a bottom end thereof respectively and for rotatably supporting the sub-spindle therein; said sub-spindle being formed with an outwardly diverging tapered bore at the bottom of the sub-spindle, a chuck bore formed adjacent to the tapered bore and a spring bore formed adjacent to the chuck bore; a chucking member forming a collet chuck coacting with the chuck bore, and a chuck actuating shaft extending from the collet chuck to the top end of the sub-spindle through the spring bore, characterized in that the chucking member is normally biased toward its fastening direction by a fastening spring arranged around the chuck actuating shaft, in that a hydraulic cylinder is mounted on a supporting frame arranged on the top cover, and in that an actuating rod of the hydraulic cylinder is arranged with its free end being opposite to the end of the chuck actuating shaft.

2. A double cutting spindle unit for a cutting machine comprising a main spindle unit having a vertical axis along which the main spindle unit can slide relative to a frame of the cutting machine; a sub-spindle unit mounted on the main spindle unit in parallel therewith and also vertically slidable relative to the main spindle unit; a sub-spindle casing for rotatably supporting the sub-spindle therein; said sub-spindle being formed with an outwardly diverging tapered bore at the bottom of the sub-spindle, a chuck bore formed adjacent to the tapered bore and a spring bore formed adjacent to the chuck bore; a chucking member forming a collet chuck coacting with the chuck bore, and a chuck actuating shaft extending from the collet chuck to the top end of the sub-spindle through the spring bore, characterized in that the chucking member is normally biased toward its fastening direction by a fastening spring arranged around the chuck actuating shaft, in that a two-stage hydraulic cylinder comprising two coaxially arranged cylinders is mounted on a supporting frame arranged on the top cover, and in that an actuating rod of the hydraulic cylinder is arranged with its free end being opposite to the end of the chuck actuating shaft.

3. A double cutting spindle unit for a cutting machine comprising a main spindle unit having a vertical axis along which the main spindle unit can slide relative to a frame of the cutting machine; a sub-spindle unit mounted on the main spindle unit in parallel therewith and also vertically slidable relative to the main spindle unit; a sub-spindle of the sub-spindle unit being formed with an outwardly diverging tapered bore at the bottom of the sub-spindle, a chuck bore formed adjacent to the tapered bore and a spring bore formed adjacent to the chuck bore; a chucking member forming a collet chuck coacting with the chuck bore, and a chuck actuating shaft extending from the collet chuck to the top end of the sub-spindle through the spring bore, characterized in that the chucking member is normally biased toward its fastening direction by a fastening spring arranged around the chuck actuating shaft, and in that the fastening spring is formed by a plurality of spiral belleville springs.

4. A double cutting spindle unit for a cutting machine comprising a main spindle unit having a vertical axis along which the main spindle unit can slide relative to a frame of the cutting machine; a sub-spindle unit mounted on the main spindle unit in parallel therewith and also vertically slidable relative to the main spindle unit; a sub-spindle casing for rotatably supporting the sub-spindle therein; said sub-spindle being formed with an outwardly diverging tapered bore at the bottom of the sub-spindle, a chuck bore formed adjacent to the tapered bore and a spring bore formed adjacent to the chuck bore; a chucking member forming a collet chuck coacting with the chuck bore, and a chuck actuating shaft extending from the collet chuck to the top end of the sub-spindle through the spring bore, characterized in that a hydraulic cylinder is mounted on a cylindrical supporting frame arranged on the top cover, in that an actuating rod of the hydraulic cylinder is arranged with its free end being opposite to the end of the chuck actuating shaft, and in that the side wall of the supporting frame is formed with a venting window.

5. A double cutting spindle unit for a cutting machine of claim 4 further comprising a detachable shroud for surrounding the frame, and wherein the shroud is formed with a venting means for ambient air.

6. A double cutting spindle unit for a cutting machine comprising a main spindle unit having a vertical axis along which the main spindle unit can slide relative to a frame of the cutting machine; a sub-spindle unit mounted on the main spindle unit in parallel therewith and also vertically slidable relative to the main spindle unit; a sub-spindle casing for rotatably supporting the sub-spindle therein; said sub-spindle being formed with an outwardly diverging tapered bore at the bottom of the sub-spindle, a chuck bore formed adjacent to the tapered bore and a spring bore formed adjacent to the chuck bore; a chucking member forming a collet chuck coacting with the chuck bore, and a chuck actuating shaft extending from the collet chuck to the top end of the sub-spindle through the spring bore, characterized in that a hydraulic cylinder is mounted on a cylindrical supporting frame arranged on the top cover, in that an actuating rod of the hydraulic cylinder is arranged with its free end being opposite to the end of the chuck actuating shaft, and in that the main spindle unit has a lower stroke limit that substantially corresponds to that of the sub-spindle unit.

* * * * *

UNITED STATES PATENT AND TRADEMARK OFFICE
CERTIFICATE OF CORRECTION

PATENT NO. : 5,980,172
DATED : November 9, 1999
INVENTOR(S) : Hiroshi Shoda

It is certified that error appears in the above-identified patent and that said Letters Patent is hereby corrected as shown below:

Title Page: Item [73], "Shoda Iron Works, Ltd.," should be --Shoda Iron Works Co., Ltd.,--.

Item [56]
On the Title Page under Attorney, Agent, or Firm, "P.L.L.C." should be --P.L.C.--

Signed and Sealed this

Eighteenth Day of July, 2000

*Attest:*

Q. TODD DICKINSON

*Attesting Officer*     *Director of Patents and Trademarks*